United States Patent
Hiramatsu et al.

(10) Patent No.: US 8,614,662 B2
(45) Date of Patent: Dec. 24, 2013

(54) DISPLAY CONTROL APPARATUS AND METHOD, AND PROGRAM

(75) Inventors: Takeshi Hiramatsu, Tokyo (JP); Mitsuyasu Asano, Tokyo (JP); Tetsuji Inada, Kanagawa (JP); Koji Nishida, Tokyo (JP)

(73) Assignee: Sony Corporation (JP)

( * ) Notice: Subject to any disclaimer, the term of this patent is extended or adjusted under 35 U.S.C. 154(b) by 418 days.

(21) Appl. No.: 12/451,783

(22) PCT Filed: Apr. 10, 2009

(86) PCT No.: PCT/JP2009/057390
§ 371 (c)(1),
(2), (4) Date: Nov. 30, 2009

(87) PCT Pub. No.: WO2009/125848
PCT Pub. Date: Oct. 15, 2009

(65) Prior Publication Data
US 2010/0188433 A1    Jul. 29, 2010

(30) Foreign Application Priority Data

Apr. 11, 2008 (JP) ................. P2008-103388

(51) Int. Cl.
G09G 3/36 (2006.01)
G09G 5/10 (2006.01)

(52) U.S. Cl.
USPC .......................................... 345/102; 345/690

(58) Field of Classification Search
USPC ............................ 345/690–693, 204, 102, 87
See application file for complete search history.

(56) References Cited

U.S. PATENT DOCUMENTS 7,859,492 B2 * 12/2010 Kohno ............................ 345/77

2006/0214904 A1    9/2006 Kimura et al.
(Continued)

FOREIGN PATENT DOCUMENTS

JP    2007-034251 A    2/2007
JP    2007-183499 A    7/2007
(Continued)

OTHER PUBLICATIONS

Supplementary European Search Report EP 09731348, dated Jun. 27, 2011.

(Continued)

*Primary Examiner* — Kenneth Bukowski
(74) *Attorney, Agent, or Firm* — Lerner, David, Littenberg, Krumholz & Mentlik, LLP

(57) ABSTRACT

The present invention relates to a display control apparatus and method, and a program that are capable of appropriately controlling the luminance of light to be emitted by backlights with simple processing. On the basis of an input image signal, a peripheral-representative-value computation unit (141) computes, as a peripheral representative value, luminance that is output by backlights of a block of interest and blocks in the periphery thereof among the backlights formed from a plurality of blocks. A peripheral-contribution-amount computation unit (142) divides the peripheral representative value by light-emission efficiency based on a light-emission profile that is an output luminance distribution when the block of interest emits light so as to compute the amount of peripheral contribution by peripheral blocks to the block of interest. A light-emission level computation unit (143) computes the backlight luminance as a light-emission level by dividing a necessary amount of light emission of the block of interest by the amount of peripheral contribution. The present invention can be applied to a display device, such as a liquid-crystal display.

7 Claims, 13 Drawing Sheets

(56) References Cited

U.S. PATENT DOCUMENTS

2007/0002000 A1 1/2007 Kwon
2009/0002308 A1 1/2009 Yoshida

FOREIGN PATENT DOCUMENTS

| JP | 2007-322901 A | 12/2007 |
| JP | 2009-014746 A | 1/2009 |
| JP | 2009139910 A | 6/2009 |
| JP | 2009198530 A | 9/2009 |
| JP | 2009251571 A | 10/2009 |

OTHER PUBLICATIONS

Office Action from Japanese Application No. 2008-103388, dated Nov. 22, 2012.

* cited by examiner

DISPLAY CONTROL APPARATUS AND METHOD, AND PROGRAM

CROSS-REFERENCES TO RELATED APPLICATIONS

The present application is a national phase entry under 35 U.S.C. §371 of International Application No. PCT/JP2009/057390 filed Apr. 10, 2009, published on Oct. 15, 2009 as WO 2009/125848 A1, which claims priority from Japanese Patent Application No. JP 2008-103388 filed in the Japanese Patent Office on Apr. 11, 2008.

TECHNICAL FIELD

The present invention relates to a display control apparatus and method, and a program, and more particularly, relates to a display control apparatus and method, and a program that are capable of appropriately controlling luminance of light to be emitted by backlights with simple processing.

BACKGROUND ART

Hitherto, as liquid-crystal display devices using a transmission-type liquid-crystal panel, liquid-crystal display devices in which a plurality of backlights are used to change the amount of light that is made to enter each of display areas (blocks) on a liquid-crystal panel and expansion of a dynamic range of the luminance of an image to be displayed is realized have been proposed (see, for example, Patent Document 1).

As described above, in a case where each of a plurality of backlights causes light to enter a corresponding one of display areas corresponding to a liquid-crystal panel, as shown in FIG. 1, the amount of light to be emitted by each backlight is obtained from an image signal of an image to be displayed.

That is, in FIG. 1, an image signal of a step-shaped waveform, indicated by an arrow A11, is input to a light-emission amount computation unit 11 and a dividing unit 12. On the basis of the image signal, the light-emission amount computation unit 11 computes the amount of light to be emitted from one backlight 13. Furthermore, the dividing unit 12 divides the supplied image signal by the amount of light from the light-emission amount computation unit 11, thereby calculating the transmittance of light in the display area of a liquid-crystal panel 14 corresponding to the backlight 13. Meanwhile, in the waveform of FIG. 1, the horizontal axis indicates the horizontal position of a backlight, and the center position indicates the center position of the backlight 13.

Here, the size of one backlight 13 is larger than the size of the pixel of the display area of the liquid-crystal panel 14. Therefore, the amount of light of the backlight 13 is computed on the basis of the pixel value of each pixel of an image displayed on the display area of the liquid-crystal panel 14 corresponding to the backlight 13.

Then, when the amount of light is computed, the backlight 13 emits light on the basis of the amount of light calculated by the light-emission amount computation unit 11, and causes light to enter the liquid-crystal panel 14. As a result, light of a waveform indicated by an arrow A12 is emitted from the backlight 13. That is, since light from the backlight 13 is diffused, the amount of light in the center of the light is largest, and the amount of light decreases with increasing distance from the center.

Furthermore, the liquid-crystal panel 14 allows light from the backlight 13 to be transmitted therethrough at a waveform indicated by an arrow A13, that is, at a transmittance computed by the dividing unit 12. As a result, in the display area of the liquid-crystal panel 14, as indicated by an arrow A14, an image that is nearly the same as the image of the input image signal is displayed.

As described above, the light-emission level of each backlight is determined on the basis of the input image signal.

However, when the light-emission level is computed on the basis of the information of the input image signal of each of blocks directly above, which are simply divided as described above, the input image signal does not have intra-block position information, and diffusion at the time when the block emits light is not considered. As a consequence, in a case where the level of the diffused light is low, pixels having insufficient luminance appear.

However, if the light-emission level is increased to prevent such luminance insufficiency, the block emits light needlessly, with the result that the original advantages, such as reduction of consumption of power and improvement of the black level, are sacrificed.

Furthermore, at the actual light-emission time, since light is diffused outside the divided areas, calculations in which an influence of light emission of the other blocks is considered become necessary. In a case where the value of the backlight is to be computed from only the included input image signal directly above, since the state of the other blocks is ignored, the block emits light needlessly. A method of controlling the amount of light emission using the histogram and the average value of the entire frames has been considered, but optimization of the amount of light emission for each local block cannot be performed.

Therefore, a technology has been proposed in which light-emission levels of other blocks are considered and adjusted, simultaneous equations of the order in an amount corresponding to the number of divisions are solved to compute and adjust the light-emission level of each block (see, for example, Patent Document 2).

Related Art Documents
Patent Documents
Patent Document 1: Japanese Unexamined Patent Application Publication No. 2007-322901
Patent Document 2: Japanese Unexamined Patent Application Publication No. 2007-034251

DISCLOSURE OF INVENTION

Technical Problems

However, in the technology disclosed in Patent Document 2, in a case where, in particular, the number of divisions is increased, there is a risk that calculations of solutions and real-time processing using hardware become difficult and also, there is a risk that, in a case where the number of divisions is further increased, implementation cannot be made.

Furthermore, as a technique for taking into consideration influences other than the influence of blocks for which processing is performed, a calculation method of the cyclic type, in which each time one of divided areas is determined, the entire influence is computed, is considered. This has a risk that the number of calculations becomes large and real-time processing cannot be realized.

The present invention has been made in view of such circumstances, and controls display so that backlights emit light at the optimum luminance in units of blocks by considering the influence of diffusion of blocks other than blocks for which processing is performed by using a simple calculation method.

Technical Solution

A display control apparatus according to an aspect of the present invention includes peripheral-representative-value computation means for computing, as a peripheral representative value, an average of luminances by backlights of a block of interest and blocks in the periphery thereof among backlights formed from a plurality of blocks; peripheral-contribution-amount computation means for subtracting the luminance of the block of interest from the peripheral representative value so as to compute the amount of peripheral contribution of luminances by the peripheral blocks to the block of interest; and backlight luminance amount computation means for computing backlight luminance on the basis of a difference between a necessary luminance by light emission of the block of interest based on an image signal and the amount of peripheral contribution.

The peripheral-representative-value computation means can include neighboring average calculation means for calculating, as a neighboring average value, an average value of luminances of neighboring blocks that exist in the neighborhood of the block of interest, the average value being assigned with a weight in correspondence with a distance from the block of interest, and peripheral average calculation means for calculating, as a peripheral average value, an average value of output luminances of peripheral blocks that exist in the periphery of the block of interest at a position further away from the block of interest than the neighboring blocks, and can compute a peripheral representative value on the basis of a weighted average between the neighboring average value and the peripheral average value.

The image processing apparatus can further include luminance center-of-gravity calculation means for calculating a center of gravity of the luminance in the block of interest as a luminance center of gravity, wherein the neighboring average calculation means can calculate, as a neighboring average value, an average value of luminances of the neighboring blocks that exist in the neighborhood of the block of interest, the average value being assigned with a weight in correspondence with a distance from the luminance center of gravity in the block of interest.

The neighboring average calculation means can calculate, as a neighboring average value, an average value of luminances of neighboring blocks that exist in the neighborhood of the block of interest by either assigning a weight in correspondence with a distance from a geometrical center of gravity in the block of interest or assigning a weight in correspondence with a distance from the luminance center of gravity in the block of interest.

The image processing apparatus can further include setting means for performing setting of either assigning a weight in correspondence with a distance from a geometrical center of gravity in the block of interest or assigning a weight in correspondence with a distance from the luminance center of gravity in the block of interest to the average value of luminances of neighboring blocks that exist in the neighborhood of the block of interest.

A display control method according to an aspect of the present invention includes: a peripheral-representative-value computation step of computing, as a peripheral representative value, an average of luminances by backlights of a block of interest and blocks in the periphery thereof among backlights formed from a plurality of blocks; a peripheral-contribution-amount computation step of subtracting the luminance of the block of interest from the peripheral representative value so as to compute the amount of peripheral contribution of luminances by the peripheral blocks to the block of interest; and a backlight luminance amount computation step of computing backlight luminance on the basis of a difference between a necessary luminance by light emission of the block of interest based on an image signal and the amount of peripheral contribution.

A program according to an aspect of the present invention causes a computer to perform processing including: a peripheral-representative-value computation step of computing, as a peripheral representative value, an average of luminances by backlights of a block of interest and blocks in the periphery thereof among backlights formed from a plurality of blocks; a peripheral-contribution-amount computation step of subtracting the luminance of the block of interest from the peripheral representative value so as to compute the amount of peripheral contribution of luminances by the peripheral blocks to the block of interest; and a backlight luminance amount computation step of computing backlight luminance on the basis of a difference between a necessary luminance by light emission of the block of interest based on an image signal and the amount of peripheral contribution.

In an aspect of the present invention, an average of luminances by backlights of a block of interest and blocks in the periphery thereof among the backlights formed from a plurality of blocks is computed as a peripheral representative value. By subtracting the luminance of the block of interest from the peripheral representative value, the amount of peripheral contribution of luminances by the peripheral blocks to the block of interest is computed. Backlight luminance is computed on the basis of a difference between a necessary luminance by light emission of the block of interest based on an image signal and the amount of peripheral contribution.

Advantageous Effects

According to an aspect of the present invention, it is possible to appropriately control luminance of light to be emitted by backlights.

MODES FOR CARRYING OUT THE INVENTION

With reference to the drawings, a description will be given below of embodiments to which the present invention is applied.

Figure 1:
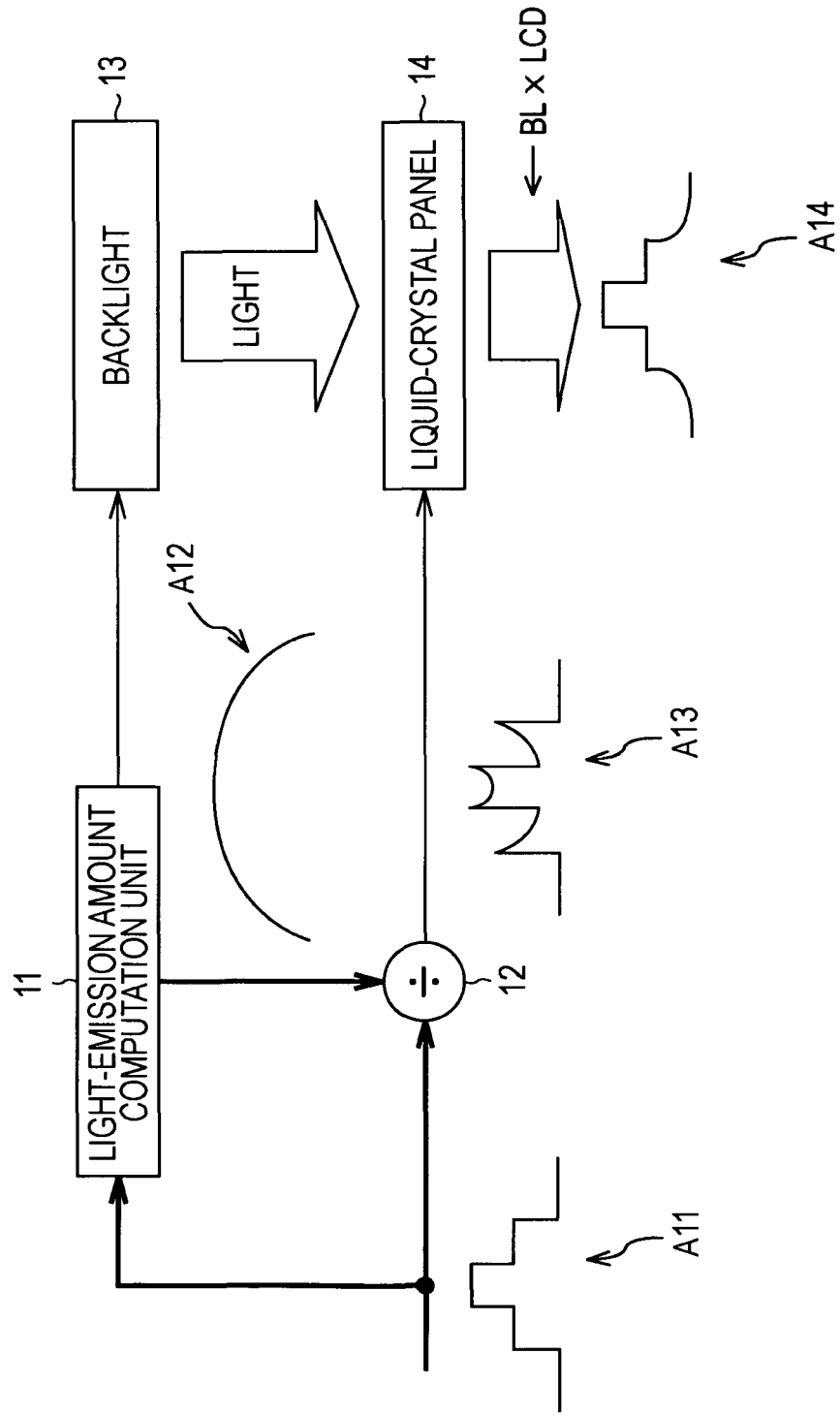
FIG. 1 shows the configuration of a liquid-crystal display device of the related art.
Figure 2:
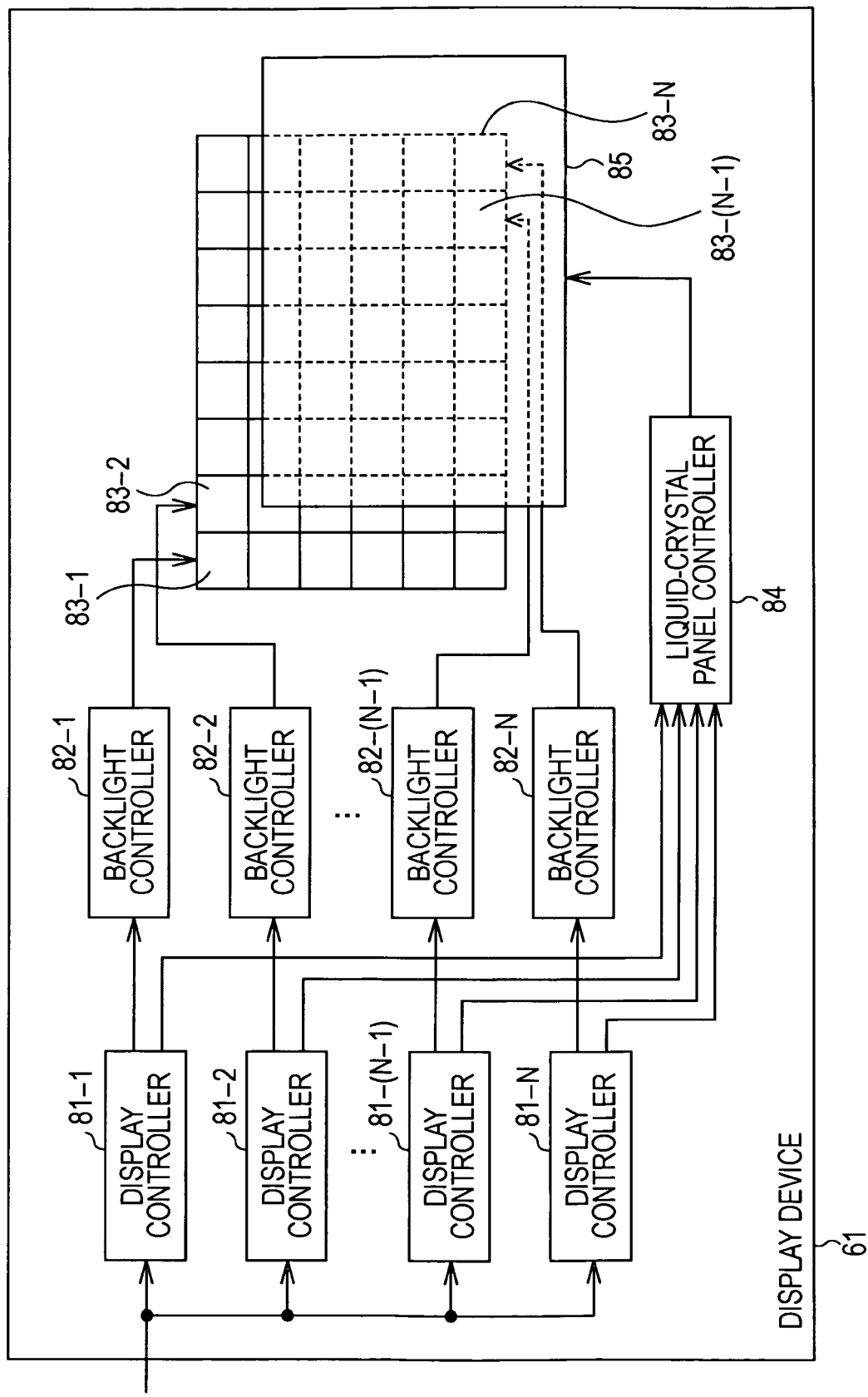
FIG. 2 shows an example of the configuration of an embodiment of a display device to which the present invention is applied.

FIG. 2 shows an example of the configuration of an embodiment of a display device to which the present invention is applied.

A display device 61 is constituted by display controllers 81-1 to 81-N, backlight controllers 82-1 to 82-N, backlights 83-1 to 83-N, a liquid-crystal panel controller 84, and a liquid-crystal panel 85.

The display device 61 is, for example, a liquid-crystal display device, such as a liquid-crystal display, with an image signal of a display image to be displayed on the liquid-crystal panel 85 being input to the display controllers 81-1 to 81-N of the display device 61.

On the basis of the input image signal, the display controllers 81-1 to 81-N compute the amount of light to be emitted by the backlights 83-1 to 83-N, in more detail, backlight luminance indicating the luminance of the light, and supply the amount of light to the backlight controllers 82-1 to 82-N.

Furthermore, on the basis of the image signal, the display controllers 81-1 to 81-N compute the transmittance of each pixel in the display area with respect to each of the display areas of the liquid-crystal panel 85 to which much of the light from each of the backlights 83-1 to 83-N enter, and supply the transmittance to the liquid-crystal panel controller 84. This transmittance is set to be a value between, for example, 0 and 1.

Meanwhile, the pixel of the display area of the liquid-crystal panel 85 refers to one cell that serves as the display unit of the image and that is formed from each of the areas through which light of each of R, G, and B is transmitted.

On the basis of the backlight luminance supplied from the display controllers 81-1 to 81-N, the backlight controllers 82-1 to 82-N control the backlights 83-1 to 83-N so as to emit light. Furthermore, the backlights 83-1 to 83-N emit light under the control of the backlight controllers 82-1 to 82-N and cause light to enter the liquid-crystal panel 85.

Meanwhile, the backlights 83-1 to 83-N cause each area for one block in a case where the entire backlight is divided into N blocks to emit light. Accordingly, in the following, blocks corresponding to the backlights 83-1 to 83-N among all the backlights will be referred to as blocks B1 to BN in such a manner as to be associated with values following a hyphen of each reference numeral. Therefore, the backlights 83-1 to 83-N cause the areas of the corresponding blocks B1 to BN among all the backlights to emit light. Alternatively, each of the areas of the blocks B1 to BN among all the backlights is made to emit light by light emitted from each of the backlights 83-1 to 83-N.

The liquid-crystal panel controller 84 enables the liquid-crystal panel 85 to allow light to be transmitted therethrough at a transmittance of each pixel, which is supplied from the display controllers 81-1 to 81-N, that is, at a numerical aperture. The liquid-crystal panel 85 causes light that enters each pixel of the display area from the backlights 83-1 to 83-N to be transmitted therethrough at the transmittance indicated by the liquid-crystal panel controller 84, and displays a display image.

Meanwhile, hereinafter, in a case where there is no need to individually discriminate among the display controllers 81-1 to 81-N, the backlight controllers 82-1 to 82-N, and the backlights 83-1 to 83-N, these will be simply referred to as the display controller 81, the backlight controller 82, and the backlight 83, respectively, and the remaining configuration will also be referred to in a similar manner. Furthermore, the entire configuration of the backlight constituted by a plurality of backlights 83 is assumed to represent the entire backlight.

In the display device 61, the backlight 83 serving as a light source is arranged on the back side of the liquid-crystal panel 85, and much of the light emitted from the backlight 83 enters the display area (block) of the liquid-crystal panel 85 opposing the backlight 83. For example, much of the light emitted from the backlight 83-1 enters a portion on the upper side in the figure of the liquid-crystal panel 85. Therefore, in a case where an image whose left upper portion in the figure of the liquid-crystal panel 85 is bright and the other portion is dark is to be displayed, only the backlight 83-1 can be made to emit light at a high luminance to a certain degree, and the other backlights 83-2 to 83-N can be made to emit light at a comparatively low luminance. As a result, it is possible to reduce the consumption of power of the backlight 83, and it is also possible to widen the dynamic range of the luminance of the display image.

Meanwhile, the display device 61 is provided with a transmission-type liquid-crystal panel 85. Not limited to the liquid-crystal panel, any type may be used as long as it is a transmission-type display panel that causes light from the backlight 83 to be transmitted therethrough so as to display an image.

Figure 3:
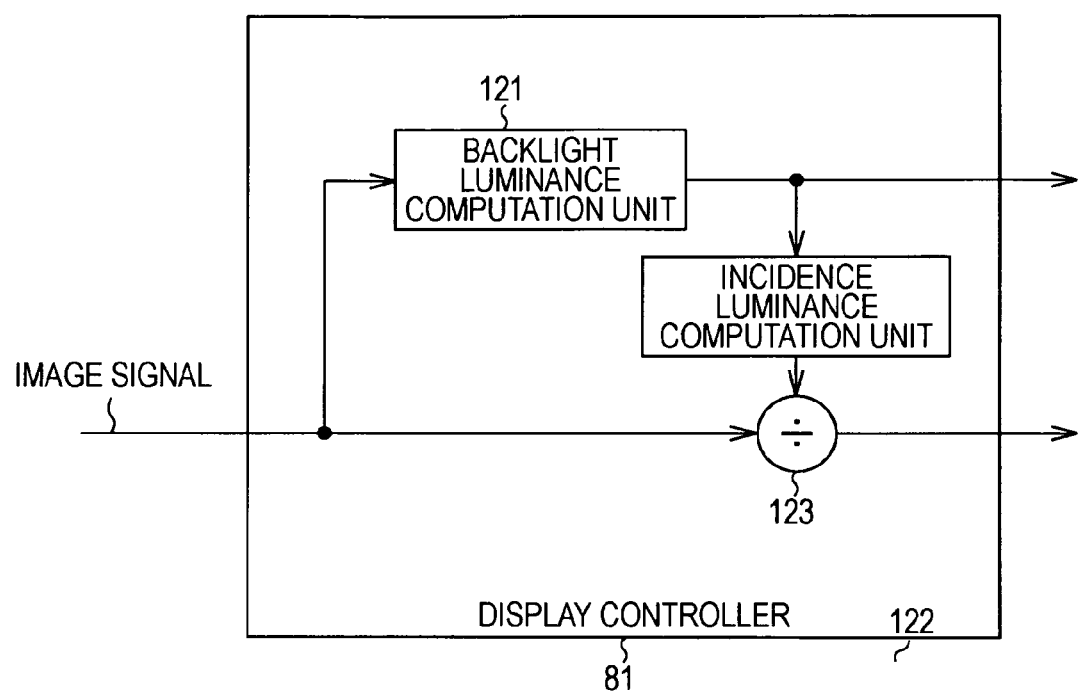
FIG. 3 illustrates an example of the configuration of a display controller of FIG. 2.

Next, a description will be given, with reference to FIG. 3, of an example of a detailed configuration of the display controller 81 of FIG. 2.

The display controller 81 is constituted by a backlight luminance computation unit 121, an incidence luminance computation unit 122, and a dividing unit 123.

An image signal input to the display controller 81 of the display device 61 is supplied to the backlight luminance computation unit 121 and the dividing unit 123 of the display controller 81. This image signal is handled as, for example, an image signal of a moving image.

On the basis of the supplied image signal, the backlight luminance computation unit 121, through processing (to be described later), computes the light-emission level of light to be emitted by the backlight 83 as a backlight luminance on the basis of the luminance (necessary luminance) of the pixel in the area displayed in the display area of the liquid-crystal panel 85 corresponding to each block of the backlight 83 among the areas in the display image based on the image signal, and supplies the backlight luminance to the incidence luminance computation unit 122.

Meanwhile, the display areas of the liquid-crystal panel 85 corresponding to the backlight 83 refer to areas that are obtained by dividing in a virtual manner the display area of the entire liquid-crystal panel 85 and to which most of the light from one backlight 83 directly below on the back side of the liquid-crystal panel 85 enters.

For example, if the display area of the liquid-crystal panel 85 is virtually divided into N areas in FIG. 2, display areas corresponding to corresponding backlights 83-1 to 83-N are made to be corresponding blocks in the display area. Hereinafter, the display area of the liquid-crystal panel 85 corresponding to the backlight 83 will also be referred to as a partial display area.

Figure 4:
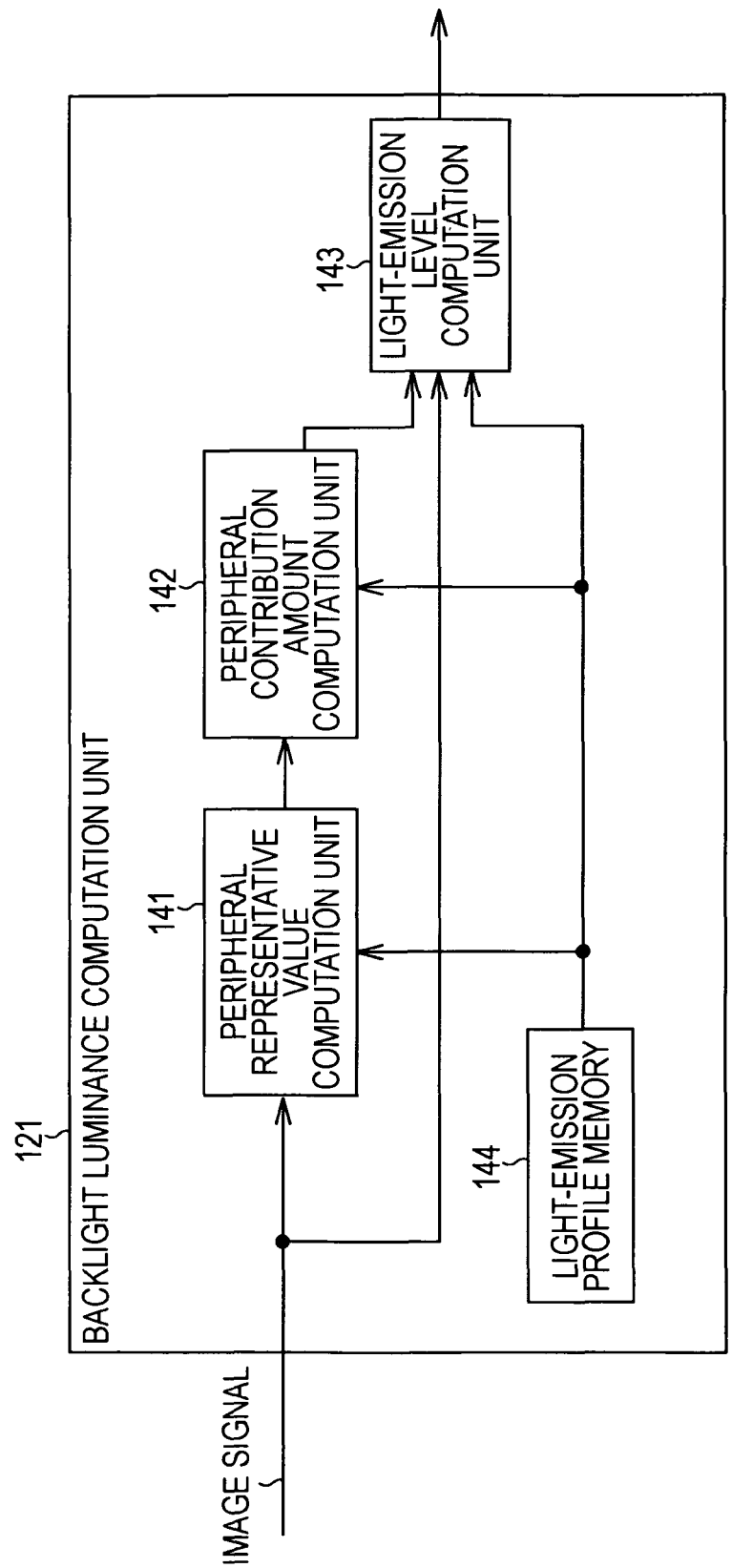
FIG. 4 illustrates an example of the configuration of a backlight luminance computation unit of FIG. 3.

Meanwhile, the detailed configuration of the backlight luminance computation unit 121 will be described later with reference to FIG. 4.

On the basis of the backlight luminance supplied from the display controller 81, the incidence luminance computation unit 122 calculates a pixel incidence luminance indicating the luminance of the light estimated to enter the pixel from the backlight 83 with respect to each pixel of the partial display area of the liquid-crystal panel 85 corresponding to the backlight 83. That is, the pixel incidence luminance is information indicating the luminance of light that is estimated to enter the pixel of the partial display area from the backlight 83 in a case where the backlight 83 emits light at the supplied backlight luminance.

For example, the incidence luminance computation unit 122 stores in advance a profile that indicates, as a distribution of diffusion coefficients, how light emitted from the backlight 83 is diffused in a case where the corresponding backlight 83 emits light. Then, by using the stored profile, the incidence luminance computation unit 122 obtains the luminance of the light estimated to enter from the backlight 83 to each pixel of the partial display area of the liquid-crystal panel 85 corresponding to the backlight 83 when the backlight 83 emits light at the backlight luminance supplied from the backlight luminance computation unit 121, and sets the luminance for each of those pixels as a pixel incidence luminance.

When the incidence luminance computation unit 122 obtains the pixel incidence luminance of each pixel of the partial display area, the incidence luminance computation unit 122 supplies those pixel incidence luminances to the dividing unit 123.

The dividing unit 123 divides the signal value of the supplied image signal, in more detail, the luminance obtained from the signal value, by the pixel incidence luminance from the incidence luminance computation unit 122 so as to calculate the transmittance of each pixel of the partial display area. Then, the dividing unit 123 supplies the calculated transmittance for each pixel to the liquid-crystal panel controller 84.

For example, a pixel in a partial display area, to which attention is paid, will be referred to as a pixel of interest. Furthermore, the pixel incidence luminance of the pixel of interest is set as CL, the backlight luminance of the backlight 83 is set as BL, and the luminance of the pixel in the display image at the same position as the pixel of interest, that is, the pixel in the display image, at which an image displayed in the pixel of interest is displayed, is set as IL. Furthermore, the transmittance of the light in the pixel of interest is set as T.

In this case, when the backlight 83 is made to emit light at the backlight luminance BL, the luminance of the light that enters the pixel of interest from the backlight 83, that is, the pixel incidence luminance of the pixel of interest, becomes CL. Then, when the pixel of interest causes light of the pixel incidence luminance CL, which enters from the backlight 83 at the transmittance T, to be transmitted therethrough, the luminance of the light that is emitted from the pixel of interest, that is, the luminance (hereinafter also referred to as a display luminance OL) of the pixel of interest, which is perceived by a user viewing the liquid-crystal panel 85, is represented by pixel incidence luminance CL×transmittance T. If the display luminance OL is equal to the luminance IL of the pixel of the display image, the same image as the display image is displayed on the liquid-crystal panel 85. Thus, if the display luminance OL is equal to the luminance IL, the following Expression (1) holds.

$$\text{Transmittance } T = (\text{luminance } IL \text{ of pixel of display image})/(\text{pixel incidence luminance } CL) \quad (1)$$

Therefore, it is possible for the dividing unit 123 to compute an appropriate transmittance T of the pixel of interest by dividing the supplied signal value of the image signal indicating the pixel value of the pixel of the display image corresponding to the pixel of interest, in more detail, the luminance IL of the pixel of the display image, by the pixel incidence luminance CL of the pixel of interest supplied from the incidence luminance computation unit 122.

Next, a description will be given, with reference to FIG. 4, of the detailed configuration of the backlight luminance computation unit 121.

The backlight luminance computation unit 121 is constituted by a peripheral-representative-value computation unit 141, a peripheral-contribution-amount computation unit 142, a light-emission level computation unit 143, and a light-emission profile memory 144.

On the basis of the input image signal, the peripheral-representative-value computation unit 141 computes, as a peripheral representative value, the luminance value when variations due to light emission when each block corresponding to each backlight 83 emits light together with the backlight 83 corresponding to peripheral blocks are averaged in a pseudo-manner, and supplies the luminance value to the peripheral-contribution-amount computation unit 142. In this case, the peripheral-representative-value computation unit 141 reads, as necessary, a profile when the backlight 83 corresponding to each block emits light, the profile being stored in the light-emission profile memory 144, and obtains a peripheral representative value by using the profile.

Figure 6:
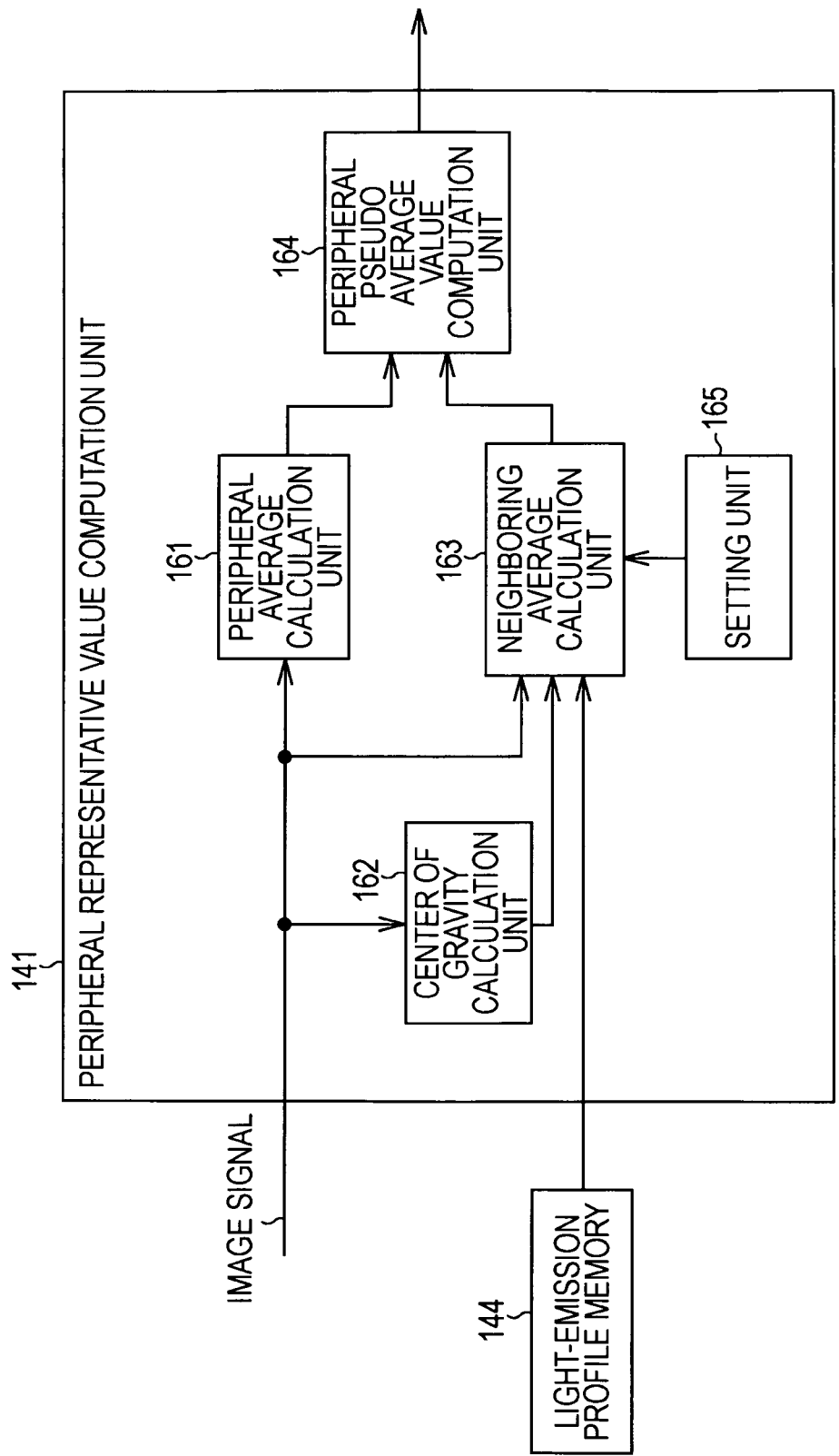
FIG. 6 illustrates an example of the configuration of a peripheral-representative-value computation unit of FIG. 4.

Meanwhile, the detailed configuration of the peripheral-representative-value computation unit 141 will be described later with reference to FIG. 6.

The peripheral-contribution-amount computation unit 142 obtains the amount of peripheral contribution to the block of interest on the basis of the peripheral representative values in units of blocks, which are supplied from the peripheral-representative-value computation unit 141, and the profile in units of each block, which is stored in the light-emission profile memory 144, and supplies the amount of peripheral contribution to the light-emission level computation unit 143.

On the basis of the amount of peripheral contribution supplied from the peripheral-contribution-amount computation unit 142 and the image signal of the input image, the light-emission level computation unit 143 computes the light-emission level in units of blocks, that is, for each backlight 83, and outputs the light-emission level as a backlight luminance.

Here, a description will be given of the relationship among the peripheral representative value, the amount of peripheral contribution, and the backlight luminance.

The backlight 83 causes the emitted light to individually enter a partial display area. In this case, as a result of the light being diffused, the light is made to also enter the peripheral partial display area. Therefore, the backlight luminance by the backlight 83 is also related to the backlight luminance in the peripheral backlights 83.

For example, if the backlight luminance at the backlight 83, that is, in units of blocks, the backlight luminance being to be computed by the backlight luminance computation unit 121, is set as the backlight luminance of the block of interest, the backlight luminance in the block of interest needs to be determined by also considering the backlight luminance in the blocks in the periphery thereof.

In this case, a typical technique is that, by accumulating the profiles of the backlights 83 corresponding to the block of interest and the blocks in the periphery thereof, the necessary backlight luminance of the block of interest is obtained. However, if the backlight luminance is to be obtained by this method, luminances of blocks need to be set one by one, and need to be computed in a cyclic manner. Thus, the number of computations becomes large, and there is a risk that real-time processing becomes difficult.

Figure 5:
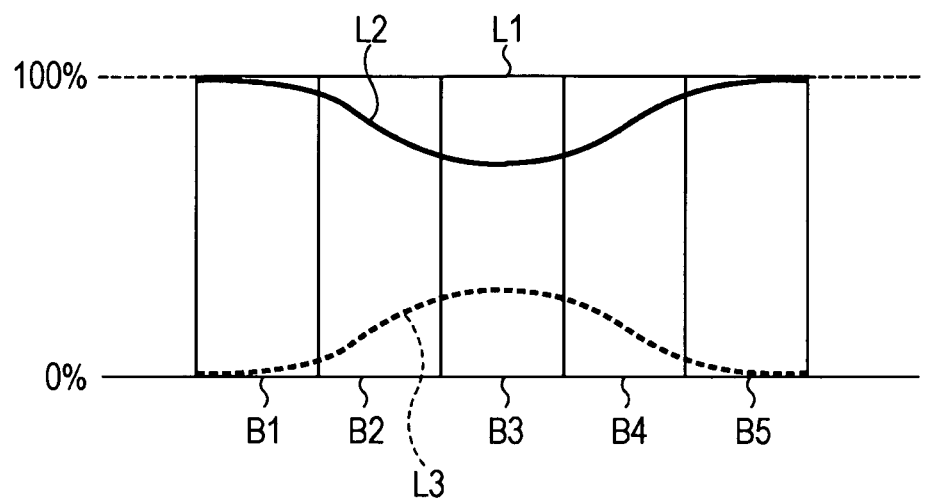
FIG. 5 illustrates a method of computing backlight luminance using the backlight luminance computation unit of FIG. 3.

Accordingly, as shown in, for example, FIG. 5, when the backlight luminance corresponding to a block B3 is to be obtained, the backlight luminance computation unit 121 obtains, as the amount of peripheral contribution, the contribution amount of the luminance, which can be acquired by the diffusion from the backlights 83 corresponding to the peripheral blocks B1, B2, B4, and B5, and obtains, as the backlight luminance of the block of interest, the amount that is insufficient for the luminance obtained as the amount of peripheral contribution with respect to the luminance in units of blocks, which is necessary in the liquid-crystal panel 85. Meanwhile, in FIG. 5, the horizontal axis indicates the direction of the one-dimensional arrangement of blocks, and the vertical axis indicates the distribution of luminances.

That is, more specifically, for example, in FIG. 5, if the blocks B1 to B5, including the block B3, emit light at the luminance of 100%, a flat luminance distribution is formed, as indicated by a straight line L1 of FIG. 5. At this time, in a case where only the block B3 is switched off, a luminance distribution indicated by a curve L2 is formed. This curve L2, when viewed with respect to the area in the block B3, can be considered to be the amount of peripheral contribution by the backlight luminances of the blocks B1, B2, B4, and B5. Therefore, for example, in such a situation, in a case where the target luminance is 100%, it is possible to consider that a luminance at which the block light luminance corresponding to a difference area sandwiched between the predecessor L1 and the curve L2 in FIG. 5, that is, the backlight luminance corresponding to the block B3, is 100%, becomes necessary.

Meanwhile, the curve L2 in FIG. 5 indicates values divided by a profile (distribution of diffusion coefficients) when the backlight 83 corresponding to the block B3 indicated by a curve L3 emits light at 100%.

However, in the ordinary display of an image, since a state in which all the backlights 83 corresponding to the blocks B1 to B5 emit light at 100% as shown in FIG. 5 is not reached, in actuality, a value lower than that at 100% indicated by the straight line L1 is reached. Accordingly, the backlight luminance computation unit 121 controls the peripheral-representative-value computation unit 141 so as to obtain, as a peripheral representative value, a pseudo average value corresponding to the straight line L1 in FIG. 5.

Furthermore, the peripheral-contribution-amount computation unit 142 obtains the peripheral representative value corresponding to the actual straight line L1 as an amount of peripheral contribution corresponding to the curve L2 of FIG. 5 by using a diffusion coefficient based on the light-emission profile of the block of interest.

Then, with respect to the luminance that is actually necessary based on the image signal, the light-emission level computation unit 143 obtains, as the backlight luminance of the backlight 83 corresponding to the block of interest, the insufficient luminance from the amount of peripheral contribution obtained in a pseudo-manner.

Next, a description will be given, with reference to FIG. 6, of an example of the configuration of an embodiment of the peripheral-representative-value computation unit 141.

The peripheral-representative-value computation unit 141 is constituted by a peripheral average calculation unit 161, a center-of-gravity calculation unit 162, a neighboring average calculation unit 163, a peripheral pseudo average value computation unit 164, and a setting unit 165.

The peripheral average calculation unit 161 obtains the average of the luminances in the peripheral blocks corresponding to the block of interest, in which neighboring blocks formed from 5×5 blocks in the horizontal direction and in the vertical direction are excluded, with the block of interest being at the center, and supplies the average of the luminances to the peripheral pseudo average value computation unit 164. Meanwhile, in this example, a description will be given of an example in which the neighboring blocks are 5×5 blocks in the horizontal direction and in the vertical direction with the block of interest being at the center. Alternatively, the neighboring blocks may be blocks in a range other than that.

On the basis of the image signal in the block of interest, the center-of-gravity calculation unit 162 calculates the center of gravity of the luminance in the block of interest on the basis of the luminance distribution in units of pixels of the block of interest and supplies the center of gravity of the luminance to the neighboring average calculation unit 163.

The neighboring average calculation unit 163 obtains, as a neighboring average value, a luminance average value with a weight (weight profile coefficient) in correspondence with the distance from the block of interest in the neighboring blocks formed from 5×5 blocks in the horizontal direction and in the vertical direction with the block of interest being at the center, and supplies the luminance average value to the peripheral pseudo average value computation unit 164. At this time, the neighboring average calculation unit 163 reads a profile in the neighboring blocks from the light-emission profile memory 144, and obtains a weighted average in correspondence with the distance from the block of interest as a neighboring average value. The manner in which the distance between the block of interest and each of the neighboring blocks should be set as the distance between the geometrical center of gravity of the block of interest and the geometrical center of gravity of each of the neighboring blocks or should be set as the distance between the center of gravity of the luminance of the block of interest and the geometrical center of gravity of each of the neighboring blocks can be set by the setting unit 165. Then, the luminance average value assigned with a weight in correspondence with one of the distances is supplied as a neighboring average value to the peripheral pseudo average value computation unit 164. Meanwhile, the details of the configuration of the neighboring average calculation unit 163 will be described later with reference to FIG. 7. Furthermore, the geometrical center of gravity referred to herein is the position of the intersection point of the diagonal lines when, for example, the block is in a rectangular shape.

The peripheral pseudo average value computation unit 164 obtains, as a peripheral representative value, the peripheral pseudo average value obtained by weight-averaging, using a reliability, the peripheral average value that is the luminance average value of the surrounding blocks, which is supplied from the peripheral average calculation unit 161, and the neighboring average value that is the luminance average value of the neighboring blocks, which is supplied from the neighboring average calculation unit 163, and supplies the peripheral pseudo average value to the peripheral-contribution-amount computation unit 142.

Figure 7:
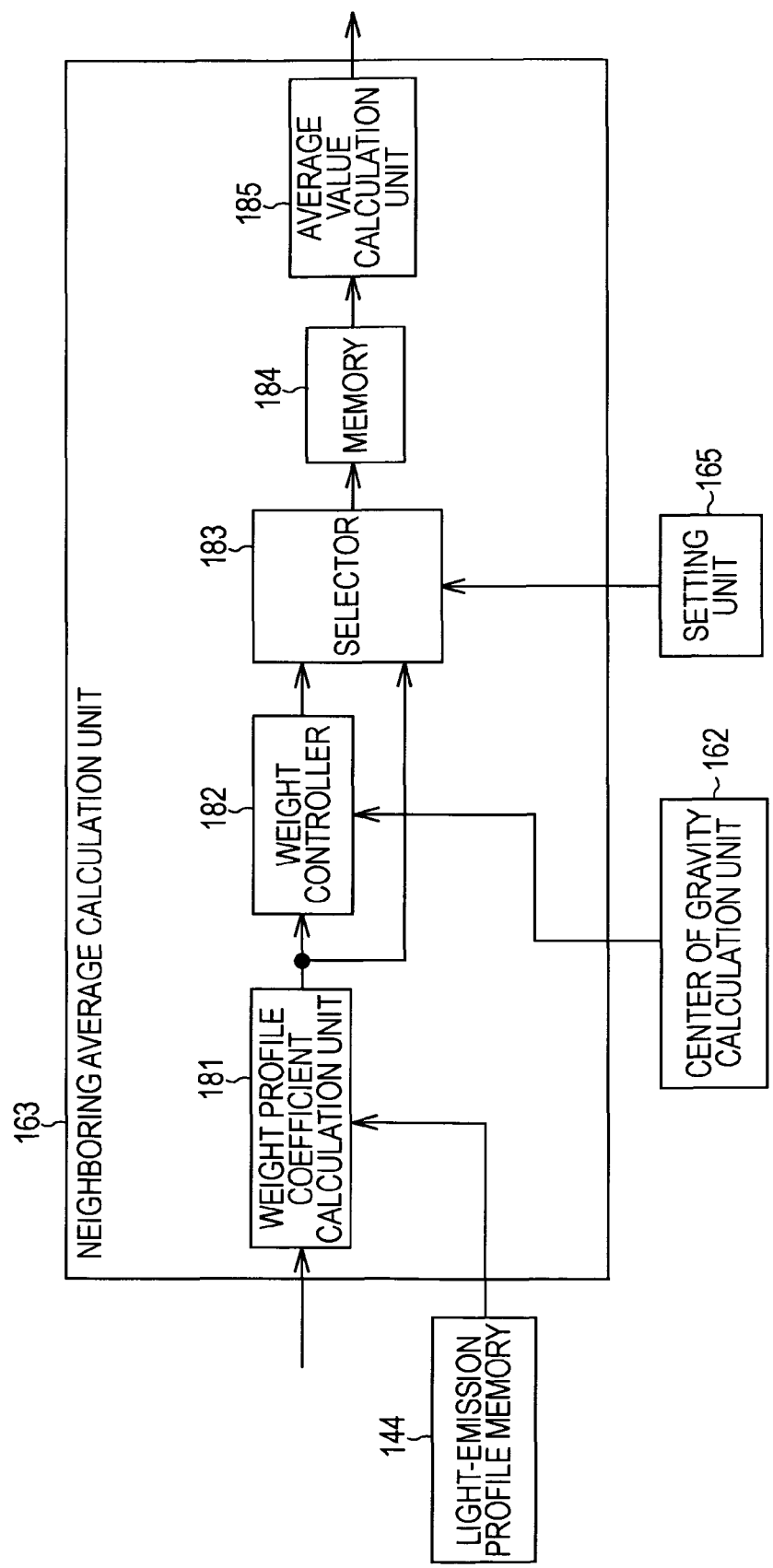
FIG. 7 illustrates an example of the configuration of a neighboring average calculation unit of FIG. 6.

Next, a description will be given, with reference to FIG. 7, of an example of the detailed configuration of an embodiment of the neighboring average calculation unit 163.

The neighboring average calculation unit 163 is constituted by a weight profile coefficient calculation unit 181, a center of gravity controller 182, a selector 183, a memory 184, and an average value calculation unit 185.

The weight profile coefficient calculation unit 181 calculates a weight profile coefficient in correspondence with the distance between the geometrical center of gravity of the neighboring blocks for which processing is performed and the geometrical center of gravity of the block of interest, and supplies the weight profile coefficient and a profile of the neighboring blocks for which processing is performed using the light-emission profile memory 144 to the center of gravity controller 182 and the selector 183.

The center of gravity controller 182 performs center of gravity control by processing the weight profile coefficient so as to become a weight profile coefficient in correspondence with the distance between the geometrical center of gravity of the neighboring blocks for which processing is performed and the center of gravity of the luminance of the block of interest, and outputs the weight profile coefficient together with the profile to the selector 183.

The selector 183 stores, in the memory 184, one of the weight profile coefficient that has been subjected to center-of-gravity control and the profile; and the weight profile coefficient that has not been subjected to center-of-gravity control and the profile in such a manner as to be associated with each other in accordance with setting performed by the setting unit 165 formed of a keyboard, an operation button, and the like.

The average value calculation unit 185 obtains an average by dividing the product sum of the profile coefficients of all the neighboring blocks and the profile, which are stored in the memory 184, by the sum of the profile coefficients, and supplies the average as a neighboring average value to the peripheral pseudo average value computation unit 164.

Figure 8:
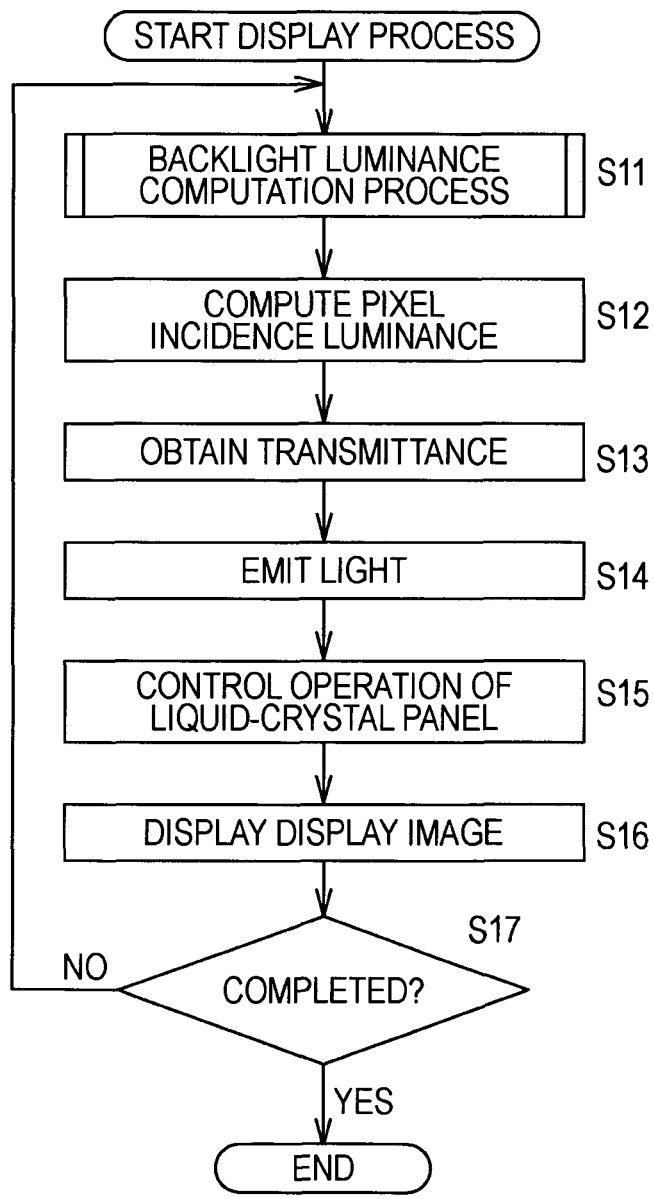
FIG. 8 is a flowchart illustrating a display process.

Next, a description will be given, with reference to the flowchart of FIG. 8, of a display process performed by the display device 61 of FIG. 2.

In step S11, the backlight luminance computation unit 121 performs a backlight luminance computation process (to be described later), computes the backlight luminance of the backlight 83 on the basis of the input image signal, and supplies the computed backlight luminance to the incidence luminance computation unit 122 and the backlight controller 82. Meanwhile, the details of the backlight luminance computation process will be described later with reference to the flowchart of FIG. 9.

In step S12, on the basis of the backlight luminance supplied from the backlight luminance computation unit 121, the incidence luminance computation unit 122 computes the pixel incidence luminance for each of the pixels of a partial display area of the liquid-crystal panel 85 corresponding to the backlight 83. The incidence luminance computation unit 122 supplies the computed pixel incidence luminance to the dividing unit 123.

In step S13, the dividing unit 123 obtains the transmittance of the pixel for each of the pixels of the partial display area by dividing the supplied image signal by the pixel incidence luminance supplied from the incidence luminance computation unit 122, and supplies the transmittance of the pixel to the liquid-crystal panel controller 84.

In step S14, on the basis of the backlight luminance supplied from the incidence luminance computation unit 122, the backlight controller 82 causes the backlight 83 to emit light at the backlight luminance. Furthermore, the backlight 83 emits light under the control of the backlight controller 82, and causes the light of the specified backlight luminance to enter the liquid-crystal panel 85.

Meanwhile, the above-described processes of steps S11 to S14 are individually performed by the display controllers 81-1 to 81-N, respectively. Furthermore, the process of step S14 is individually performed by each of the backlight controllers 82-1 to 82-N and by each of the backlights 83-1 to 83-N.

In step S15, on the basis of the transmittance for each of the pixels of the display area of the liquid-crystal panel 85, which is supplied from the display controller 81, the liquid-crystal panel controller 84 controls the operation of the liquid-crystal panel 85 so as to change the transmittance of each pixel.

In step S16, under the control of the liquid-crystal panel controller 84, the liquid-crystal panel 85 changes the transmittance of the pixel of the display area to a transmittance specified for each pixel, and causes light that enters from the backlight 83 to be transmitted therethrough, thereby displaying a display image.

In step S17, the display device 61 determines whether or not the display of the display image should be completed. For example, in a case where the completion of the display of the display image is instructed by a user or the display image of all the frames of the supplied image signal is displayed, the display of the display image is determined to be completed.

When it is determined in step S17 that the display of the display image should not be completed, the process returns to step S11, and the above-described processing is repeated. That is, the backlight luminance and the transmittance are obtained with regard to the display image of the next frame, and the display image is displayed.

In comparison, when it is determined in step S17 that the display of the display image should be completed, each unit of the display device 61 completes the processing being performed, and the display process is completed.

In the manner described above, when the image signal is supplied, the display device 61 obtains the backlight luminance and the transmittance, and displays the display image.

Next, a description will be given, with reference to the flowchart of FIG. 9, of a backlight luminance computation process, which is a process of step S11 in the flowchart of FIG. 8.

In step S21, the peripheral-representative-value computation unit 141 performs a peripheral-representative-value computation process so as to compute a peripheral representative value, and supplies the peripheral representative value to the peripheral-contribution-amount computation unit 142.

Next, a description will be given, with reference to the flowchart of FIG. 10, of a peripheral-representative-value computation process.

Figure 11:
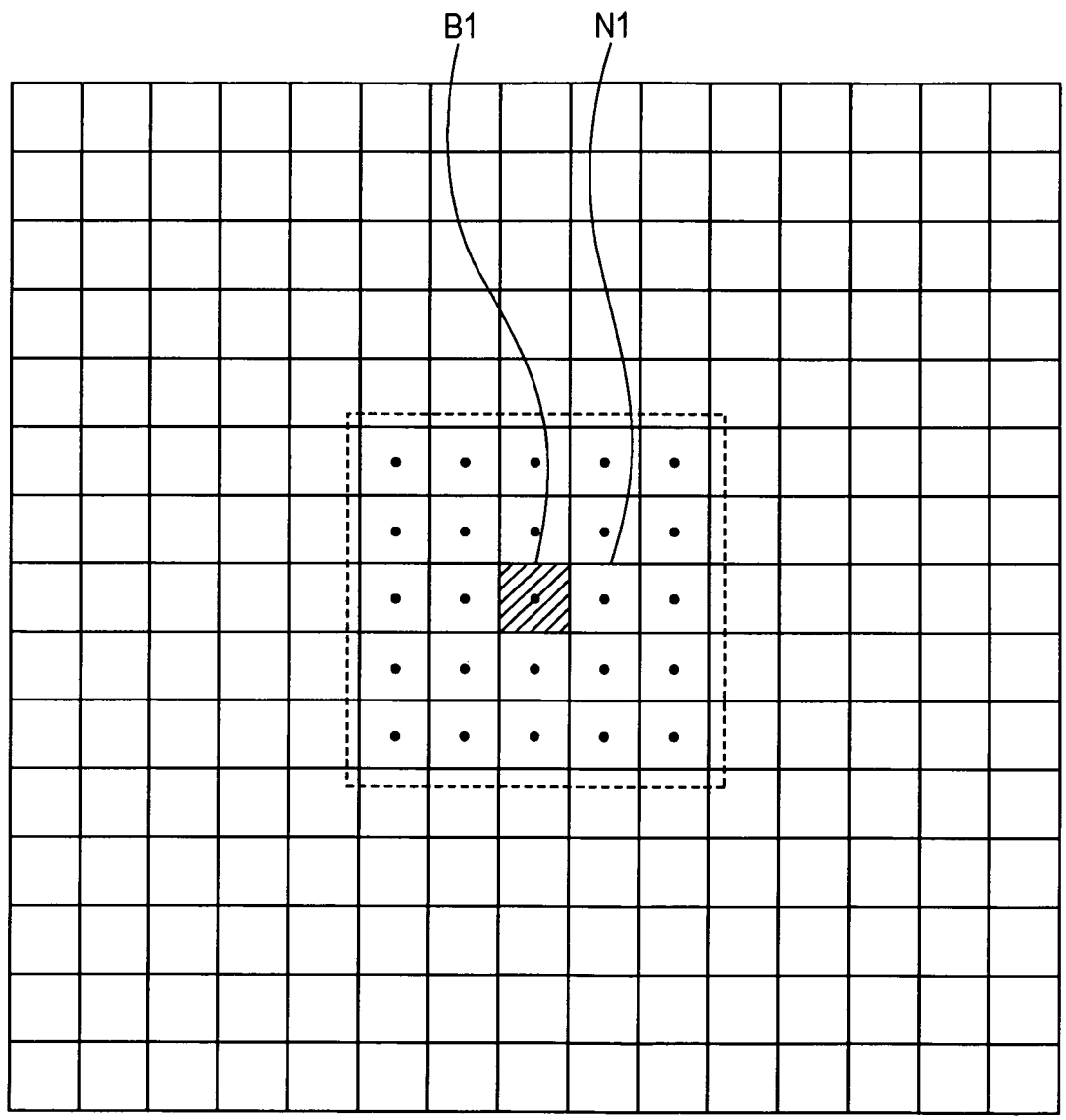
FIG. 11 illustrates a peripheral-representative-value computation process.

In step S41, the peripheral average calculation unit 161 calculates the peripheral average value of the peripheral blocks. Here, the peripheral blocks, as shown in, for example, FIG. 11, are blocks that exist in the periphery of the block of interest, in which neighboring blocks indicated by 5×5 blocks encircled using a dotted line with the block of interest B1 for which processing is performed being at the center are excluded. Accordingly, the peripheral average calculation unit 161 calculates the average value of the luminances in the peripheral blocks and supplies the average value to the peripheral pseudo average value computation unit 164.

Figure 12:
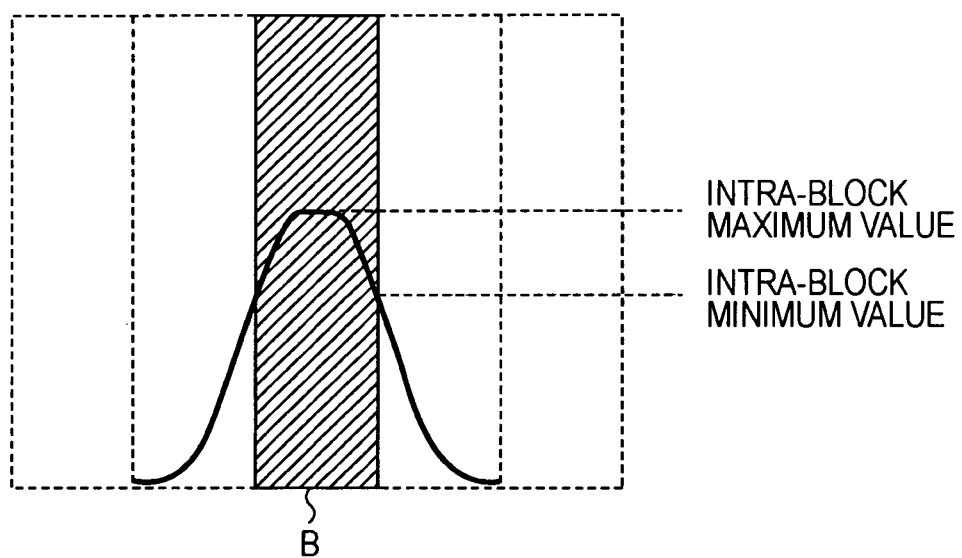
FIG. 12 illustrates a peripheral-representative-value computation process.

By the way, in the distribution of the luminances of the backlight 83 corresponding to each block, an intra-block maximum value is reached in the central portion, as shown by the block B of FIG. 12. With increasing distance from the center, the luminance is decreased, and an intra-block minimum value is reached in the outermost peripheral portion which is a boundary with the adjacent block. In a case where luminances in units of blocks are handled as described above, the distribution of the luminances is not uniform. Accordingly, in the peripheral average calculation unit 161 and the neighboring average calculation unit 163, a profile indicating the luminance distribution of each block is read from the light-emission profile memory 144, and calculations are performed on the basis of the maximum value of the outermost peripheral portion.

Meanwhile, in the example of FIG. 11, the average value of the luminances is obtained with regard to all the blocks, in which the neighboring blocks indicated by 5×5 blocks encircled using a dotted line with the block of interest B1 being at the center are excluded. Alternatively, by setting the blocks to only the range having a large influence on the block of interest, for example, the blocks in which the neighboring blocks among the blocks of 7×7 blocks with the block of interest being at the center are excluded may be set as the peripheral blocks.

In step S42, on the basis of the image signal, the center-of-gravity calculation unit 162 calculates the center of gravity position of the luminance within the block of interest, and supplies the center of gravity position of the luminance to the center of gravity controller 182 of the neighboring average calculation unit 163. That is, within a block, if the light-emission state in each pixel within the block is uniform, the luminance distribution by the light emission of the backlight 83 is a distribution in which the intra-block maximum value is taken in the vicinity of the center shown in FIG. 12 and the intra-block minimum value is taken in the outermost peripheral portion close to the block boundary. In practice, the distribution of the luminances of the backlight 83 is changed due to the distribution of the light emission of each pixel within the block. Accordingly, on the basis of the image signal, the center-of-gravity calculation unit 162 calculates the center of gravity position by assigning a weight based on the luminance of each pixel within the block, thereby calculating the center of gravity position based on the luminances within the block.

In step S43, by performing a neighboring average value calculation process, the neighboring average calculation unit 163 obtains, as a neighboring average value, the average value of the luminances based on weighting in correspondence with the distance to a total of 24 neighboring blocks indicated by 5×5 blocks encircled using a dotted line with the block of interest B1 shown in FIG. 11 being at the center, and supplies the average value to the peripheral pseudo average value computation unit 164.

Figure 13:
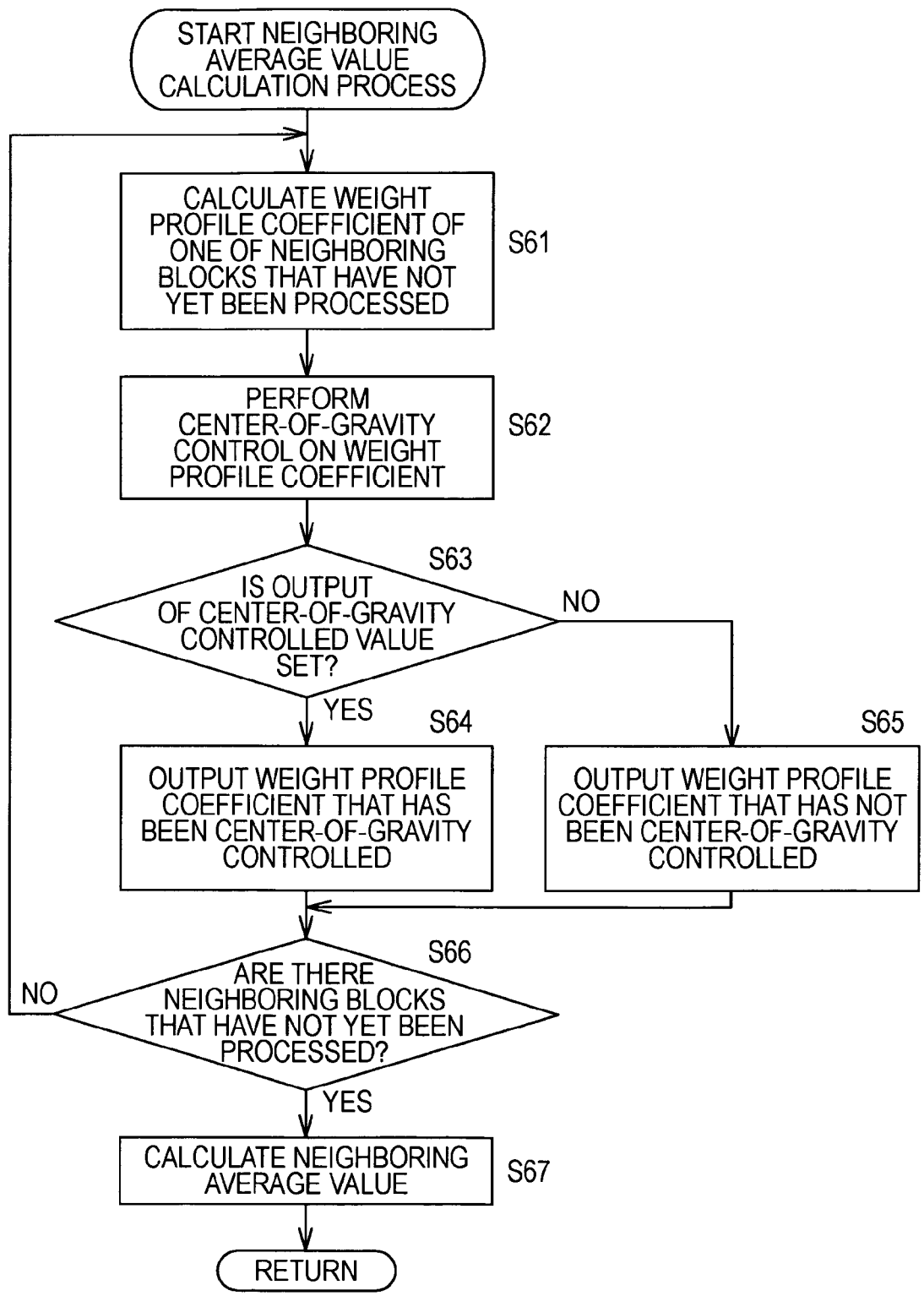
FIG. 13 is a flowchart illustrating a neighboring average value calculation process.

Here, a description will be given below, with reference to the flowchart of FIG. 13, a neighboring average value calculation process.

In step S61, the weight profile coefficient calculation unit 181 sets one of neighboring blocks for which processing has not yet been performed as a block for which processing is performed, calculates a weight profile coefficient ki so as to be inversely proportional to the distance between the geometrical center of gravity position of the set neighboring blocks for which processing is performed and the geometrical center of gravity position of the block of interest, and supplies the weight profile coefficient ki to the center of gravity controller 182 and the selector 183. At this time, the weight profile coefficient calculation unit 181 reads a profile of neighboring blocks for which processing is performed from the light-emission profile memory 144, and supplies the luminance that is the maximum value of the outermost peripheral portion of the block, as a luminance pi of the neighboring blocks for which processing is performed, to the center of gravity controller 182 and the selector 183. Meanwhile, i in the weight profile coefficient ki and the luminance pi of the neighboring blocks is an identifier for identifying a neighboring block. That is, in FIG. 11, i is 1 to 24.

In step S62, on the basis of the center of gravity of the luminance supplied from the center-of-gravity calculation unit 162, the center of gravity controller 182 performs center of gravity control so that the weight profile coefficient ki obtained in correspondence with the distance between the geometrical center of gravity of the neighboring blocks and the geometrical center of gravity of the block of interest becomes a weight profile coefficient Ki obtained in correspondence with the distance between the geometrical center of gravity of the neighboring blocks and the center of gravity of the luminance of the block of interest, and supplies the weight profile coefficient to the selector 183. At this time, the center of gravity controller 182 also supplies the corresponding luminance pi to the selector 183.

Figure 14:
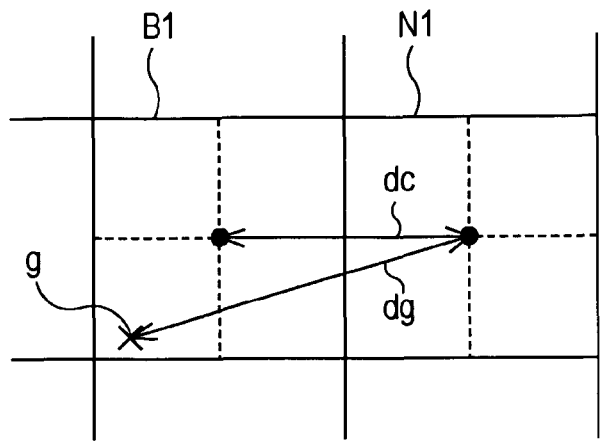
FIG. 14 illustrates a neighboring average value calculation process.

That is, for example, in the case of the neighboring block N1 and the block of interest B1 in FIG. 11, the weight profile coefficient ki calculated by the weight profile coefficient calculation unit 181 has been calculated in accordance with the distance dc between geometrical centers of gravity shown in FIG. 14. In contrast, the center of gravity controller 182 performs center of gravity control so that the weight profile coefficient ki becomes the weight profile coefficient Ki obtained on the basis of the distance dg between the center of gravity g of the luminance of the block of interest B1 and the geometrical center of gravity of the neighboring blocks N1, as shown in FIG. 14. More specifically, the following Expression (2) is computed to perform center of gravity control of the weight profile coefficient ki, thereby calculating a weight profile coefficient Ki.

$$Ki = dc/dg \times ki \qquad (2)$$

Here, Ki denotes the weight profile coefficient subjected to center of gravity control, dc denotes the distance between the geometrical centers of gravity of the block of interest and the neighboring blocks, dg denotes the distance between the center of gravity of the luminance of the block of interest and the geometrical center of gravity of the neighboring blocks, and ki denotes the weight profile coefficient that has not been subjected to center of gravity control. That is, center of gravity control is a conversion process from the weight profile coefficient ki to Ki on the basis of the ratio of the distance dc between the geometrical centers of gravity of the block of interest and the neighboring blocks to the distance dg between the center of gravity of the luminance of the block of interest and the geometrical center of gravity of the neighboring blocks.

As a result of these processes, when the process of step S62 is completed, the weight profile coefficient Ki that has been subjected to center-of-gravity control, which is supplied from the center of gravity controller 182, and the weight profile coefficient ki that has not been subjected to center-of-gravity control, which is supplied from the weight profile coefficient calculation unit 181, have been supplied together with the information on the respective profiles to the selector 183.

Accordingly, in step S63, the selector 183 determines whether or not setting has been performed by the setting unit 165 so that the weight profile coefficient Ki that has been subjected to center-of-gravity control in advance is selectively output to the memory 184 and stored therein. When it is determined in step S63 that, for example, setting has been performed by the setting unit 165 so that the weight profile coefficient Ki that has been subjected to center-of-gravity control in advance is selectively output to the memory 184 and stored therein, in step S64, the selector 183 stores the weight profile coefficient Ki that has been subjected to center-of-gravity control and the corresponding luminance pi in the memory 184 in such a manner as to be associated with each other.

On the other hand, when it is determined in step S63 that setting has not been performed by the setting unit 165 so that the weight profile coefficient Ki that has been subjected to center-of-gravity control in advance is selectively output to the memory 184 and stored therein, that is, setting has been performed so that the weight profile coefficient ki that has not been subjected to center-of-gravity control is selectively output to the memory 184 and stored therein, in step S65, the selector 183 stores the weight profile coefficient ki that has not been subjected to center-of-gravity control and the corresponding luminance pi in the memory 184 in such a manner as to be associated with each other.

In step S66, the weight profile coefficient calculation unit 181 determines whether or not a neighboring block that has not yet been processed exists. When a neighboring block that has not yet been processed exists, the process returns to step S61. That is, processing of steps S61 to S66 is repeated until weight profile coefficients in correspondence with distances between all the neighboring blocks and the block of interest are calculated and stored in the memory 184. Then, for example, in the example of FIG. 11, since 24 neighboring blocks exist, when the weight profile coefficients k1 to k24 or K1 to K24 and the corresponding luminances p1 to p24 are stored in the memory 184, it is determined in step S66 that a neighboring block that has not yet been processed does not exist, and the process proceeds to step S67.

In step S67, the average value calculation unit 185 divides the product sum (=k1×p1+. . . k24×p24) of all the weight profile coefficients ki or Ki and the luminance pi, which is stored in the memory 184, by the grand total (=k1+ . . . +k24, or K1+ . . . +K24) of the weight profile coefficient ki or Ki, so as to obtain a neighboring average value, and supplies the neighboring average value to the peripheral pseudo average value computation unit 164.

As a result of the above processing, the average value of the luminances of the neighboring blocks of the block of interest is obtained as a neighboring average value on which a weighting average process has been performed using weight profile coefficients in correspondence with distances between the block of interest and the neighboring blocks.

Figure 10:
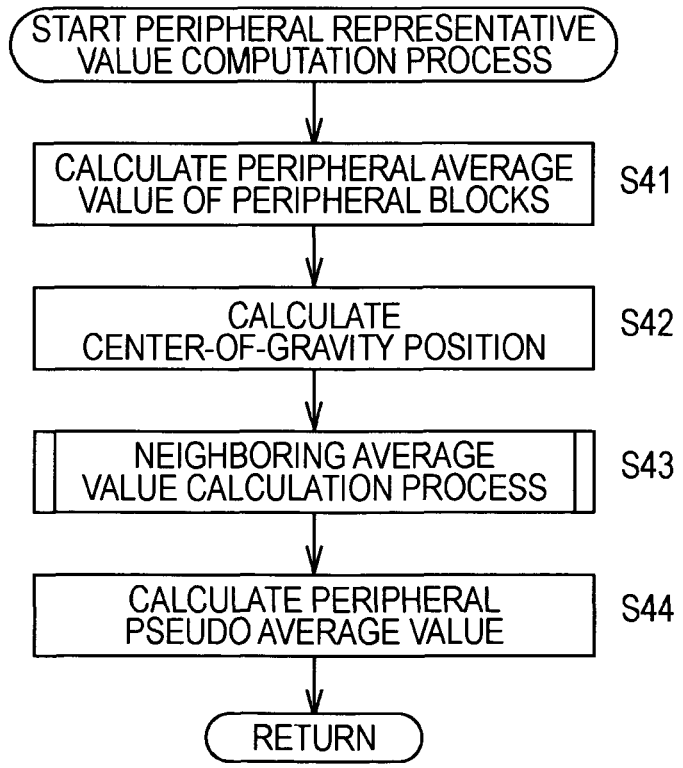
FIG. 10 is a flowchart illustrating a peripheral-representative-value computation process.

At this point, the description returns to the flowchart of FIG. 10.

When the neighboring average value is obtained as a result of the process of step S43, in step S44, the peripheral pseudo average value computation unit 164 supplies, to the peripheral-contribution-amount computation unit 142, an average based on the respective reliabilities of the peripheral average value ave1 supplied from the peripheral average calculation unit 161 and the neighboring average value ave2 supplied from the neighboring average calculation unit 163, the average being set as a peripheral representative value ave.

More specifically, the peripheral pseudo average value computation unit 164 calculates a peripheral pseudo average value by calculating the following Expression (3), and supplies the calculation result as a peripheral representative value ave to the peripheral-contribution-amount computation unit 142.

$$\text{ave}=(\text{ave}1\times A+\text{ave}2\times B)/(A+B) \quad (3)$$

Here, ave denotes the peripheral pseudo average value of the block of interest, that is, the peripheral representative value, ave1 denotes the peripheral average value, A denotes the reliability of the peripheral average value, ave2 denotes the neighboring average value, and B denotes the reliability of the neighboring average value. Meanwhile, the neighboring average value ave2 obtained on the basis of the neighboring blocks close to the block of interest is considered to have a higher reliability in considering the amount of contribution to the block of interest than that of the peripheral average value ave1 on the basis of the peripheral blocks further away from the block of interest than the neighboring blocks. Thus, in general, B>A is set.

As a result of the above processing, a peripheral pseudo average value, which is a pseudo average luminance when an image corresponding to the image signal is to be displayed on the basis of the block of interest and blocks that exist in the neighborhood and in the periphery, is computed, and the value is supplied as a peripheral representative value to the peripheral-contribution-amount computation unit 142.

Figure 9:
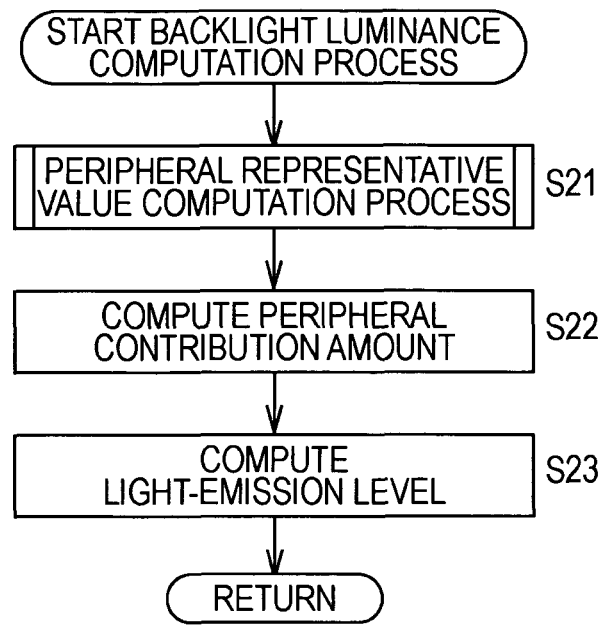
FIG. 9 is a flowchart illustrating a backlight luminance computation process.

At this point, the description returns to the flowchart of FIG. 9.

In step S21, the peripheral representative value of the block of interest is obtained by the peripheral-representative-value computation process and is supplied to the peripheral-contribution-amount computation unit 142. Then, the process proceeds to step S22.

In step S22, the peripheral-contribution-amount computation unit 142 accesses the light-emission profile memory 144, reads the profile of the block of interest, obtains a diffusion coefficient pb that is the maximum value in the outermost peripheral portion of the block of interest, computes the amount of peripheral contribution gp of the block of interest by calculating the following Expression (4), and supplies the diffusion coefficient pb to the light-emission level computation unit 143.

$$gp=\text{ave}\times(1-pb) \quad (4)$$

Here, gp denotes the amount of peripheral contribution, ave denotes the peripheral representative value, and pb denotes the diffusion coefficient at which the maximum value in the outermost peripheral portion of the block of interest is reached.

That is, the amount of peripheral contribution gp is the luminance that can be acquired by the diffusion of the backlight 83 of the neighboring blocks and the peripheral blocks even in a state in which the block of interest is switched off under the condition in which the luminance that is the peripheral representative value can be emitted as a result of each of the block of interest, the neighboring block, and the surrounding block emitting light.

In step S23, the light-emission level computation unit 143 accesses the light-emission profile memory 144, reads the profile of the block of interest, obtains the diffusion coefficient pb that is the maximum value in the outermost peripheral portion of the block of interest, calculates the following Expression (5) on the basis of the relationship with the necessary luminance pt based on the image signal so as to compute the light-emission level of the block of interest, and supplies the light-emission level as a backlight luminance bkl to the backlight controller 82.

$$bkl=(pt-gp)/pb \quad (5)$$

Here, bkl denotes the light-emission level of the block of interest, that is, the backlight luminance, pt denotes the luminance necessary in the block of interest based on the image signal, gp denotes the amount of peripheral contribution, and pb denotes the diffusion coefficient that is the maximum value in the outermost peripheral portion of the block of interest.

That is, the value obtained by dividing the difference between the necessary luminance and the amount of peripheral contribution by the diffusion coefficient that is the maximum value in the outermost peripheral portion of the block of interest is obtained as the backlight luminance.

The above-described processing will be summarized. The peripheral-representative-value computation process allows a pseudo average luminance in the periphery of the block of interest when the block of interest, the neighboring block, and the surrounding block emit light in a pseudo-manner on the basis of the image signal to be obtained as a peripheral representative value. Next, by using the obtained peripheral representative value, the luminance of the block of interest in a state in which only the block of interest does not emit light is obtained as an amount of peripheral contribution. If restored to the original, the luminance that can be acquired by the block of interest through the diffusion of the backlight of the neighboring blocks and the peripheral blocks is obtained as a pseudo amount of peripheral contribution. Then, the luminance obtained by dividing the difference between the luminance that is necessary actually based on the image signal in the block of interest and the amount of peripheral contribution that is obtained in a pseudo-manner by the diffusion coefficient that is the maximum value in the outermost peripheral portion of the block of interest is obtained as the backlight luminance.

According to the foregoing, it is possible to obtain the backlight luminance of the backlight corresponding to the block of interest with only calculations for obtaining the backlight luminance from the difference between the amount of peripheral contribution that is obtained from a simple average value using a weight profile coefficient in correspondence with the distance and the necessary luminance on the basis of the profiles of the peripheral blocks and the neighboring blocks. As a result, it is not necessary to consider the light-emission levels of the other blocks, solve simultaneous equations of the order for the number of divisions so as to calculate and adjust the light-emission level of each block, or perform cyclic calculations, as has been to date. Thus, it becomes possible to cause backlights to emit light at an optimum luminance in units of blocks with simple and high-speed processing.

By the way, the above-described series of image processing can be performed by hardware and also by software. When the series of processing is to be performed by software, a program constituting the software is installed from a recording medium into a computer that is incorporated in specialized hardware, or such a program is installed from a recording medium into a general-purpose computer capable of performing various processes by installing various programs.

Figure 15:
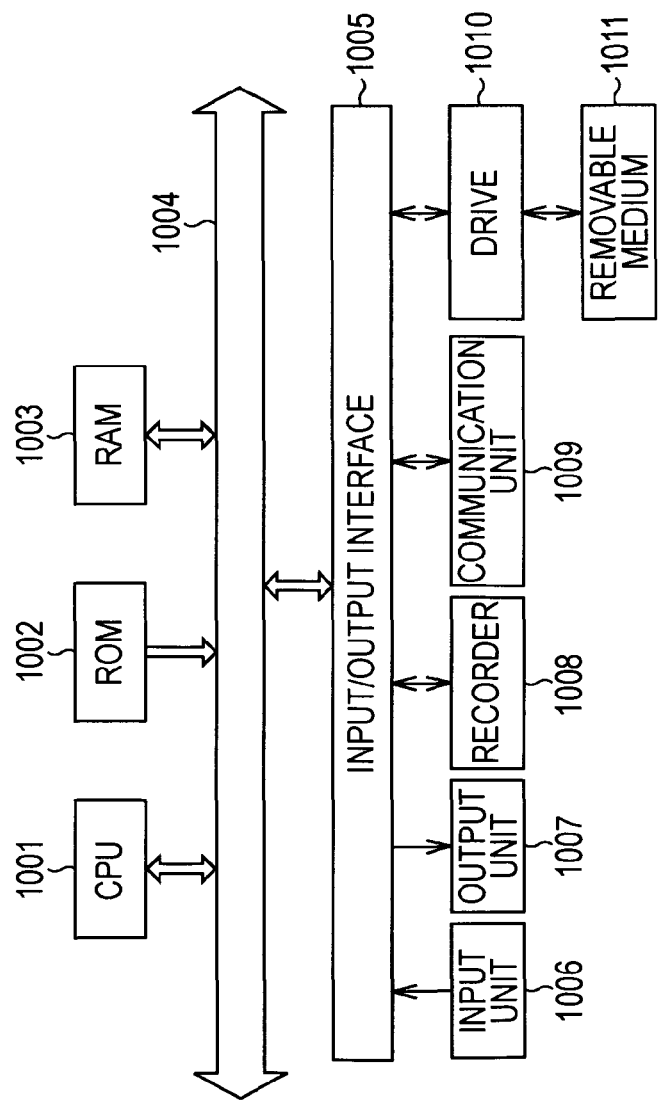
FIG. 15 is an illustration of an example of the configuration of a general-purpose personal computer.

FIG. 15 shows an example of the configuration of general-purpose personal computer. This personal computer incorporates a CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

Connected to the input/output interface 1005 are an input unit 1006 including input devices, such as a keyboard via which a user inputs operation commands, a mouse, and the like, an output unit 1007 for outputting a process operation screen and an image of a processing result on a display device, a storage unit 1008 including a hard disk drive for storing programs and various kinds of data, and the like, and a communication unit 1009 that includes a LAN (Local Area Network) adaptor, and the like and that performs communication processing via a network typified by the Internet. Furthermore, a drive 1010 for reading and writing data from and to a removable medium 1011, such as a magnetic disk (including a flexible disk), an optical disc (including a CD-ROM (Compact Disc-Read Only Memory) and a DVD (Digital Versatile Disc)), a magneto-optical disc (including an MD (Mini Disc), or a semiconductor memory is connected thereto.

The CPU 1001 performs various kinds of processing in accordance with a program stored in the ROM 1002 or in accordance with a program that is read from the removable medium 1011, such as a magnetic disk, an optical disc, a magneto-optical disc, or a semiconductor memory and installed into the storage unit 1008, and that is loaded from the storage unit 1008 into the RAM 1003. In the RAM 1003, data necessary for the CPU 1001 to perform various kinds of processing is stored as appropriate.

Meanwhile, in this specification, steps describing a program recorded on a recording medium include processes that are performed in a time-series manner according to the written order, but also processes that are performed in parallel or individually although they may not be performed in a time-series manner.

Explanation of Reference Numerals

61 display device, 81-1 to 81-N, 81 display controller, 82-1 to 82-N, 82 backlight controller, 83-1 to 83-N, 83 backlight, 84 liquid-crystal panel controller, 85 liquid-crystal panel, 121 backlight luminance computation unit, 122 incidence luminance computation unit, 123 dividing unit, 141 peripheral-representative-value computation unit, 142 peripheral-contribution-amount computation unit, 143 light-emission level computation unit, 144 light-emission profile memory, 161 peripheral average calculation unit, 162 center-of-gravity calculation unit, 163 neighboring average calculation unit, 164 peripheral pseudo average value computation unit, 181 weight profile coefficient calculation unit, 182 center of gravity controller, 183 selector, 184 memory, 185 average value calculation unit

The invention claimed is:

1. A display control apparatus comprising:
   peripheral-representative-value computation means for computing, as a peripheral representative value, an average of luminances by backlights of blocks in the periphery of a block of interest among backlights formed from a plurality of blocks;
   peripheral-contribution-amount computation means for computing an amount of peripheral contribution of luminances by the peripheral blocks to the block of interest based on the peripheral representative value and a diffusion coefficient that is the maximum value in an outermost peripheral portion of the block of interest; and
   light-emission level computation means for computing light-emission level of the block of interest, wherein the light-emission level of the block of interest is proportional to a difference between a necessary luminance of the block of interest based on an image signal and the amount of peripheral contribution, and is inversely proportional to the diffusion coefficient.

2. The display control apparatus according to claim 1, wherein the peripheral-representative-value computation means includes
   neighboring average calculation means for calculating, as a neighboring average value, an average value of luminances of neighboring blocks that exist in the neighborhood of the block of interest, the average value being assigned with a weight in correspondence with a distance from the block of interest, and
   peripheral average calculation means for calculating, as a peripheral average value, an average value of output luminances of peripheral blocks that exist in the periphery of the block of interest at a position further away from the block of interest than the neighboring blocks, and computes a peripheral representative value on the basis of a weighted average between the neighboring average value and the peripheral average value.

3. The display control apparatus according to claim 2, further comprising luminance center-of-gravity calculation means for calculating a center of gravity of the luminance in the block of interest as a luminance center of gravity, wherein the neighboring average calculation means calculates, as a neighboring average value, an average value of luminances of the neighboring blocks that exist in the neighborhood of the block of interest, the average value being assigned with a weight in correspondence with a distance from the luminance center of gravity in the block of interest.

4. The display control apparatus according to claim 3, wherein the neighboring average calculation means calculates, as a neighboring average value, an average value of luminances of neighboring blocks that exist in the neighborhood of the block of interest by either assigning a weight in correspondence with a distance from a geometrical center of gravity in the block of interest or assigning a weight in correspondence with a distance from the luminance center of gravity in the block of interest.

5. The display control apparatus according to claim 4, further comprising setting means for performing setting of either assigning a weight in correspondence with a distance from a geometrical center of gravity in the block of interest or assigning a weight in correspondence with a distance from the luminance center of gravity in the block of interest to the average value of luminances of neighboring blocks that exist in the neighborhood of the block of interest.

6. A display control method comprising:
   a peripheral-representative-value computation step of computing, as a peripheral representative value, an average of luminances by backlights of blocks in the periphery of a block of interest among backlights formed from a plurality of blocks;
   a peripheral-contribution-amount computation step of computing an amount of peripheral contribution of luminances by the peripheral blocks to the block of interest based on the peripheral representative value and a diffusion coefficient that is the maximum value in an outermost peripheral portion of the block of interest; and
   a light-emission level computation step of computing light-emission level of the block of interest, wherein the light-emission level of the block of interest is proportional to a difference between a necessary luminance of the block of interest based on an image signal and the amount of peripheral contribution, and is inversely proportional to the diffusion coefficient.

7. A non-transitory computer readable medium for storing computer implemented instructions, said instructions for causing a computer system to perform a display control method, the display control method comprising:
   a peripheral-representative-value computation step of computing, as a peripheral representative value, an average of luminances by backlights of blocks in the periphery of a block of interest among backlights formed from a plurality of blocks;
   a peripheral-contribution-amount computation step of computing an amount of peripheral contribution of luminances by the peripheral blocks to the block of interest based on the peripheral representative value and a diffusion coefficient that is the maximum value in an outermost peripheral portion of the block of interest; and
   a light-emission level computation step of computing light-emission level of the block of interest, wherein the light-emission level of the block of interest is proportional to a difference between a necessary luminance of the block of interest based on an image signal and the amount of peripheral contribution, and is inversely proportional to the diffusion coefficient.

* * * * *